US012580489B2

(12) United States Patent
Lu et al.

(10) Patent No.: US 12,580,489 B2
(45) Date of Patent: Mar. 17, 2026

(54) DC/DC CONVERTER AND CONTROL METHOD THEREOF

(71) Applicant: Delta Electronics (Shanghai) Co., Ltd., Shanghai (CN)

(72) Inventors: Hao Lu, Shanghai (CN); Yifan Zhang, Shanghai (CN); Yili Cai, Shanghai (CN); Licheng Bao, Shanghai (CN); Jia Sun, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 265 days.

(21) Appl. No.: 18/135,086

(22) Filed: Apr. 14, 2023

(65) Prior Publication Data

US 2023/0369984 A1 Nov. 16, 2023

(30) Foreign Application Priority Data

May 12, 2022 (CN) .......................... 202210518114.X

(51) Int. Cl.
*H02M 3/335* (2006.01)
*H02M 1/08* (2006.01)

(52) U.S. Cl.
CPC ......... *H02M 3/33573* (2021.05); *H02M 1/08* (2013.01); *H02M 3/33576* (2013.01); *H02M 3/33592* (2013.01)

(58) Field of Classification Search
CPC ............... H02M 1/08; H02M 3/33576; H02M 3/33592; H02M 3/33573
USPC .......................................................... 363/17
See application file for complete search history.

(56) References Cited

U.S. PATENT DOCUMENTS

| | | | | |
|---|---|---|---|---|
| 2015/0078036 A1* | 3/2015 | Jovanovic | ......... | H02M 3/33573 |
| | | | | 363/17 |
| 2018/0166973 A1 | 6/2018 | Luerkens et al. | | |
| 2020/0251992 A1 | 8/2020 | Peng et al. | | |

FOREIGN PATENT DOCUMENTS

| | | | |
|---|---|---|---|
| CN | 102437743 A | | 5/2012 |
| CN | 103812317 B | | 8/2016 |
| CN | 111224555 B | | 8/2020 |
| CN | 211266772 U | * | 8/2020 |
| CN | 112134453 B | | 10/2021 |
| JP | 2010148227 A | | 7/2010 |

* cited by examiner

*Primary Examiner* — Thienvu V Tran
*Assistant Examiner* — Lauren Ashley Shaw
(74) *Attorney, Agent, or Firm* — KIRTON McCONKIE; Evan R. Witt

(57) ABSTRACT

A DC/DC converter includes a switching circuit and a capacitor. The switching circuit includes a first bridge arm and a second bridge arm connected in parallel. The first bridge arm includes a first switch and a second switch. The second bridge arm includes a third switch and a fourth switch. The capacitor is electrically connected with a node between the first switch and the second switch. While the switching circuit is switched from a half-bridge mode to a full-bridge mode, the duty cycle of the control signal for controlling the fourth switch is gradually decreased from 100% to be synchronized with the duty cycle of the control signal for controlling the first switch. Then, the duty cycle of the control signal for controlling the third switch is gradually increased from zero to be synchronized with the duty cycle of the control signal for controlling the second switch.

19 Claims, 11 Drawing Sheets

DC/DC CONVERTER AND CONTROL METHOD THEREOF

CROSS-REFERENCE TO RELATED APPLICATION

This application claims priority to China Patent Application No. 202210518114.X, filed on May 12, 2022, the entire contents of which are incorporated herein by reference for all purposes.

FIELD OF THE INVENTION

The present disclosure relates to a DC/DC converter and a control method of the DC/DC converter, especially a DC/DC converter that can be dynamically switched between a full-bridge mode and a half-bridge mode and a control method of the DC/DC converter.

BACKGROUND OF THE INVENTION

With the advancement of Internet technologies, cloud computing technologies, electric vehicle technologies, industrial automation technologies and associated technologies, the demands for electric power are gradually increasing. Consequently, the DC/DC converters, which are key components in power equipment, need to be further developed. For example, the voltage levels of some electric vehicles rise from 400V to 800V. In order to achieve this purpose, the DC/DC converters need to have a wide input voltage range. Conventionally, the DC/DC converter is equipped with two stage conversion circuits to acquire the wide input voltage range. Due to the arrangement of the two stage conversion circuits, the volume of the conventional DC/DC converter is large, and the cost of the conventional DC/DC converter is high.

In some conventional DC/DC converters, the purpose of acquiring the wide input voltage range is achieved by switching the operation mode between a single-stage full-bridge mode and a single-stage half-bridge mode. Generally, the DC/DC converter is selectively in the full-bridge mode or the half-bridge mode according to the input voltage. That is, the operation mode of the DC/DC converter cannot be dynamically switched during the operations of the DC/DC converter. Consequently, once the input voltage changes, it is necessary to disable the DC/DC converter and restart the DC/DC converter, and the DC/DC converter is operated in the corresponding operation mode according to the input voltage. That is, if the input voltage is not stable, the conventional DC/DC voltage cannot generate the output voltage stably.

Moreover, for the DC/DC converter switching the operation mode between the single-stage full-bridge mode and the single-stage half-bridge mode, the half-bridge mode usually has a symmetric half-bridge circuitry topology. In other words, it is necessary to additionally equip a switching element and two voltage-divider capacitors in the primary side of the transformer. Consequently, the volume and the cost of the DC/DC converter are increased. Moreover, the use of the additional switching element increases the power loss. Consequently, the operation efficiency of the DC/DC converter is reduced.

Therefore, there is a need of providing an improved DC/DC converter and a control method of the DC/DC converter in order to overcome the drawbacks of the conventional technologies.

SUMMARY OF THE INVENTION

An object of the present disclosure provides a DC/DC converter with small volume, low cost, low power loss and high efficiency.

Another object of the present disclosure provides a control method of the DC/DC converter.

In accordance with an aspect of the present disclosure, a DC/DC converter is provided. The DC/DC converter includes an input terminal, a switching circuit, a capacitor, a transformer and a control circuit. The switching circuit is electrically connected with the input terminal. The switching circuit includes a first bridge arm and a second bridge arm connected in parallel. The first bridge arm includes a first switch and a second switch connected in series. The second bridge arm includes a third switch and a fourth switch connected in series. The switching circuit is selectively operated in a full-bridge mode or in a half-bridge mode. A first terminal of the capacitor is electrically connected with a first node between the first switch and the second switch. The transformer includes a primary winding. The primary winding is electrically connected with a second terminal of the capacitor and a second node between the third switch and the fourth switch. The control circuit generates a plurality of control signals for controlling operations of the switching circuit. While the switching circuit is switched from the full-bridge mode to the half-bridge mode, the first switch and the second switch are alternately turned on and turned off under the control of the control circuit, and a duty cycle of the control signal for controlling the third switch that is originally synchronized with a duty cycle of the control signal for controlling the second switch is gradually decreased to zero under the control of the control circuit. When the duty cycle of the control signal for controlling the third switch is not zero, a duty cycle of the control signal for controlling the fourth switch is synchronized with a duty cycle of the control signal for controlling the first switch under the control of the control circuit. After the duty cycle of the control signal for controlling the third switch is changed to zero, the duty cycle of the control signal for controlling the fourth switch is gradually increased to 100% under the control of the control circuit. While the switching circuit is switched from the half-bridge mode to the full-bridge mode, the first switch and the second switch are alternately turned on and turned off under the control of the control circuit, and the duty cycle of the control signal for controlling the fourth switch that is originally equal to 100% is gradually decreased to be synchronized with the duty cycle of the control signal for controlling the first switch under the control of the control circuit. After the duty cycle of the control signal for controlling the fourth switch is synchronized with the duty cycle of the control signal for controlling the first switch, the duty cycle of the control signal for controlling the third switch is gradually increased from zero to be synchronized with the duty cycle of the control signal for controlling the second switch. The third switch is turned on only in a time interval when the second switch is turned on.

In accordance with another aspect of the present disclosure, a control method of a DC/DC converter is provided. The control method includes the following steps. Firstly, the DC/DC converter is provided. The DC/DC converter includes an input terminal, a switching circuit, a capacitor and a transformer. The switching circuit is electrically connected with the input terminal and includes a first bridge arm and a second bridge arm connected in parallel, the first bridge arm includes a first switch and a second switch connected in series, the second bridge arm includes a third switch and a fourth switch connected in series, and the switching circuit is selectively operated in a full-bridge mode or in a half-bridge mode. A first terminal of the capacitor is electrically connected with a first node between the first switch and the second switch. The transformer includes a primary winding, the primary winding is electrically connected with a second terminal of the capacitor and a second node between the third switch and the fourth switch. Secondly, a control circuit is provided. The control circuit generates a plurality of control signals for controlling operations of the switching circuit. The first switch and the second switch are alternately turned on and turned off under the control of the control circuit. Then, a duty cycle of the control signal for controlling the third switch and a duty cycle of the control signal for controlling the fourth switch are adjusted so as to allow the switching circuit to be switched between the full-bridge mode and the half-bridge mode. While the switching circuit is switched from the full-bridge mode to the half-bridge mode, the duty cycle of the control signal for controlling the third switch that is originally synchronized with a duty cycle of the control signal for controlling the second switch is gradually decreased to zero under the control of the control circuit, wherein when the duty cycle of the control signal for controlling the third switch is not zero, the duty cycle of the control signal for controlling the fourth switch is synchronized with a duty cycle of the control signal for controlling the first switch under the control of the control circuit, wherein after the duty cycle of the control signal for controlling the third switch is changed to zero, the duty cycle of the control signal for controlling the fourth switch is gradually increased to 100% under the control of the control circuit, wherein the third switch is turned on only in a time interval when the second switch is turned on. While the switching circuit is switched from the half-bridge mode to the full-bridge mode, the duty cycle of the control signal for controlling the fourth switch that is originally equal to 100% is gradually decreased to be synchronized with the duty cycle of the control signal for controlling the first switch under the control of the control circuit, wherein after the duty cycle of the control signal for controlling the fourth switch is synchronized with the duty cycle of the control signal for controlling the first switch, the duty cycle of the control signal for controlling the third switch is gradually increased from zero to be synchronized with the duty cycle of the control signal for controlling the second switch, wherein the third switch is turned on only in the time interval when the second switch is turned on.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
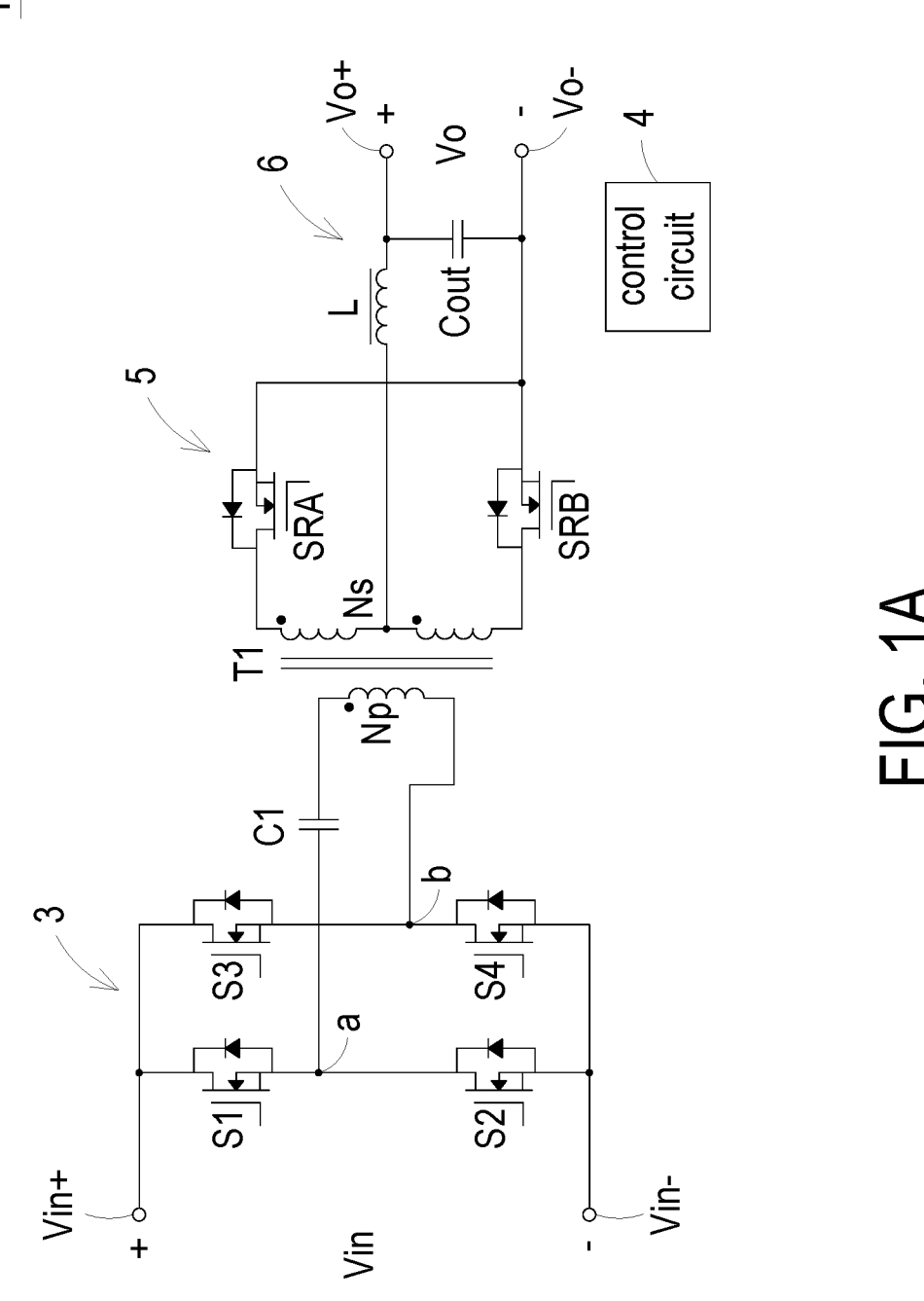
FIG. 1A is a schematic circuit diagram illustrating the circuitry topology of a DC/DC converter operating in a full-bridge mode according to a first embodiment of the present disclosure.
Figure 1B:
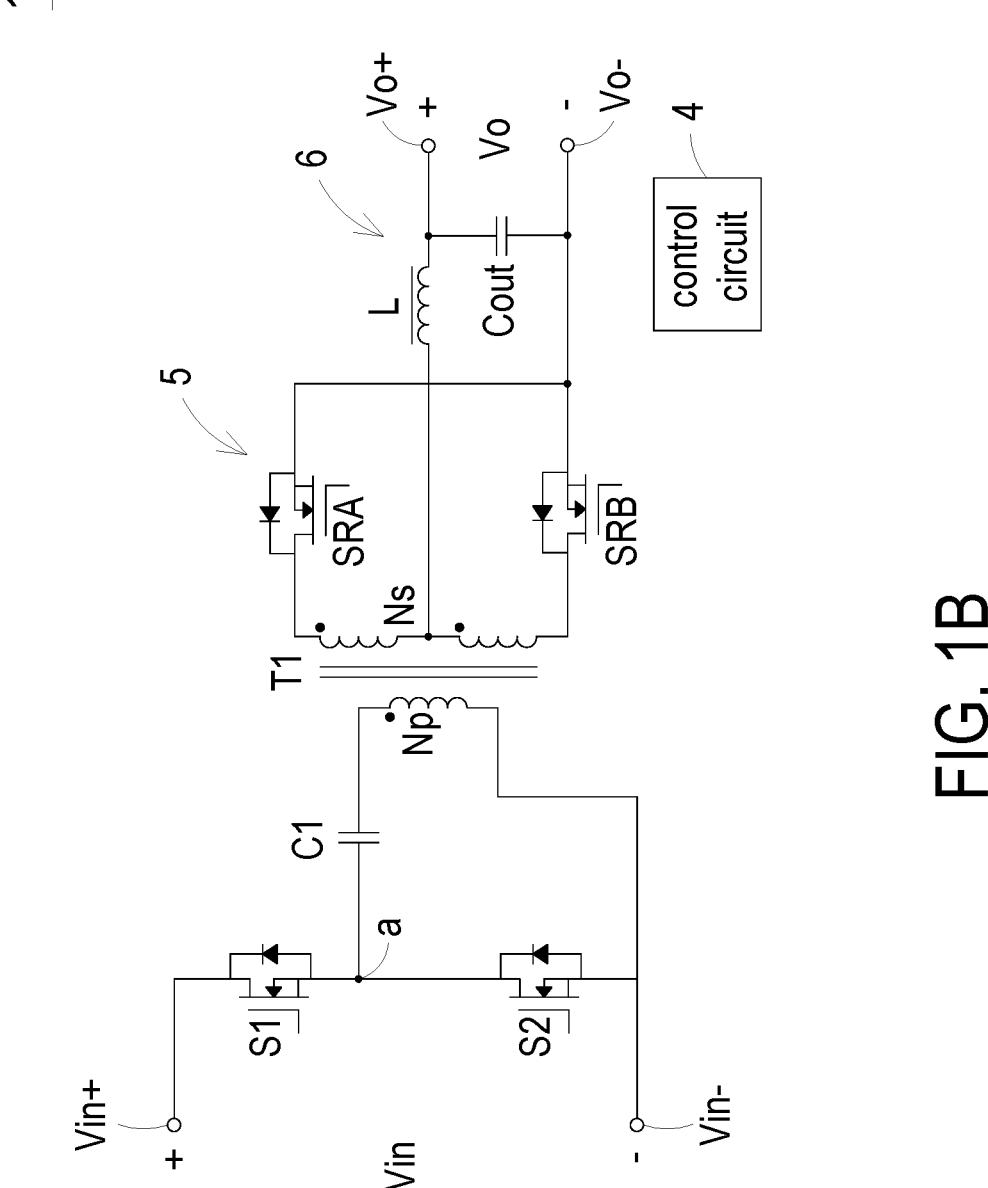
FIG. 1B is a schematic circuit diagram illustrating the circuitry topology of the DC/DC converter of the first embodiment operating in a half-bridge mode.
Figures 2A, 2B:
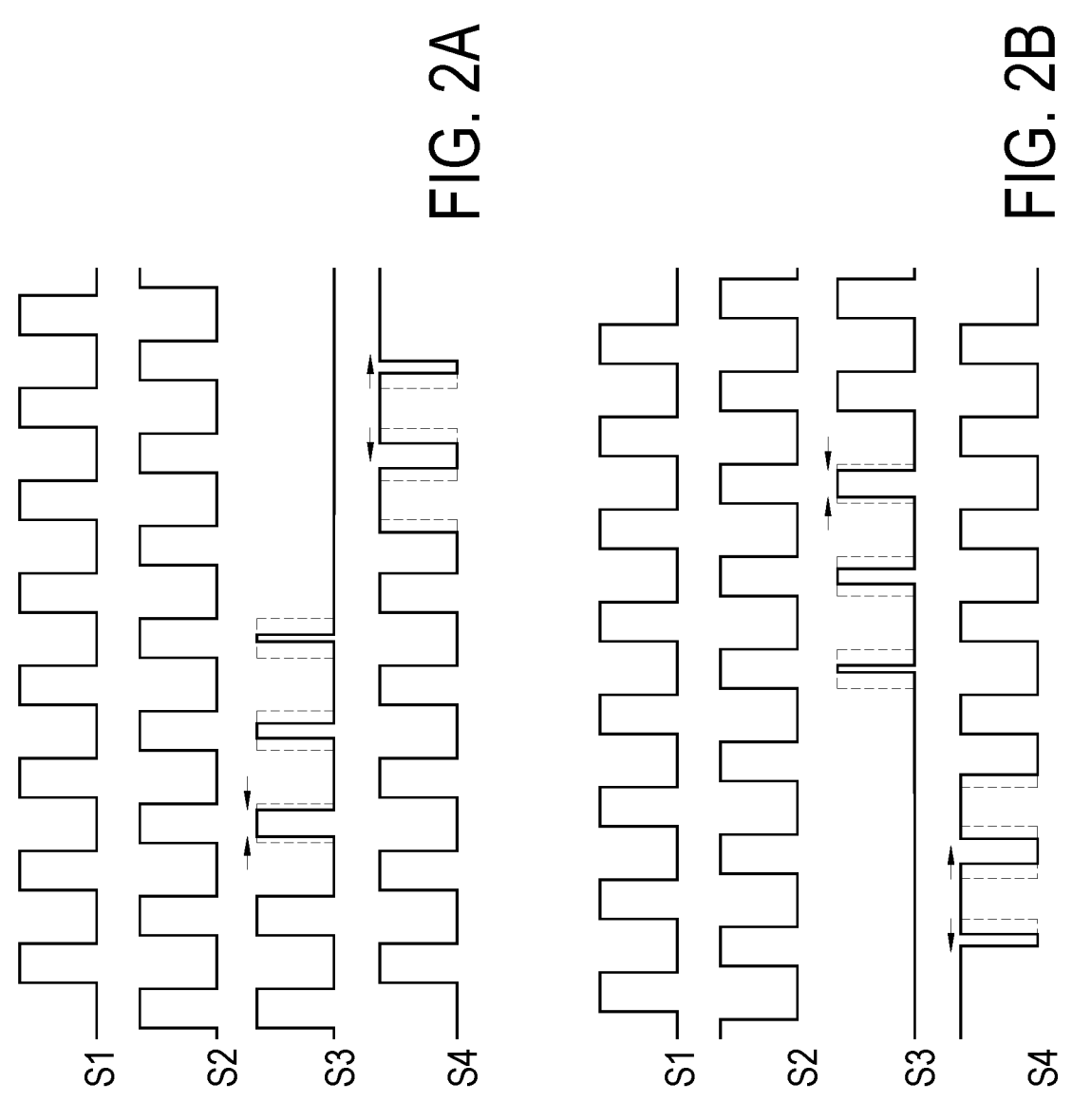
FIG. 2A is a waveform diagram illustrating associated control signals when the DC/DC converter as shown in FIG. 1A is switched from the full-bridge mode to the half-bridge mode.
FIG. 2B is a waveform diagram illustrating associated control signals when the DC/DC converter as shown in FIG. 1A is switched from the half-bridge mode to the full-bridge mode.
Figure 3:
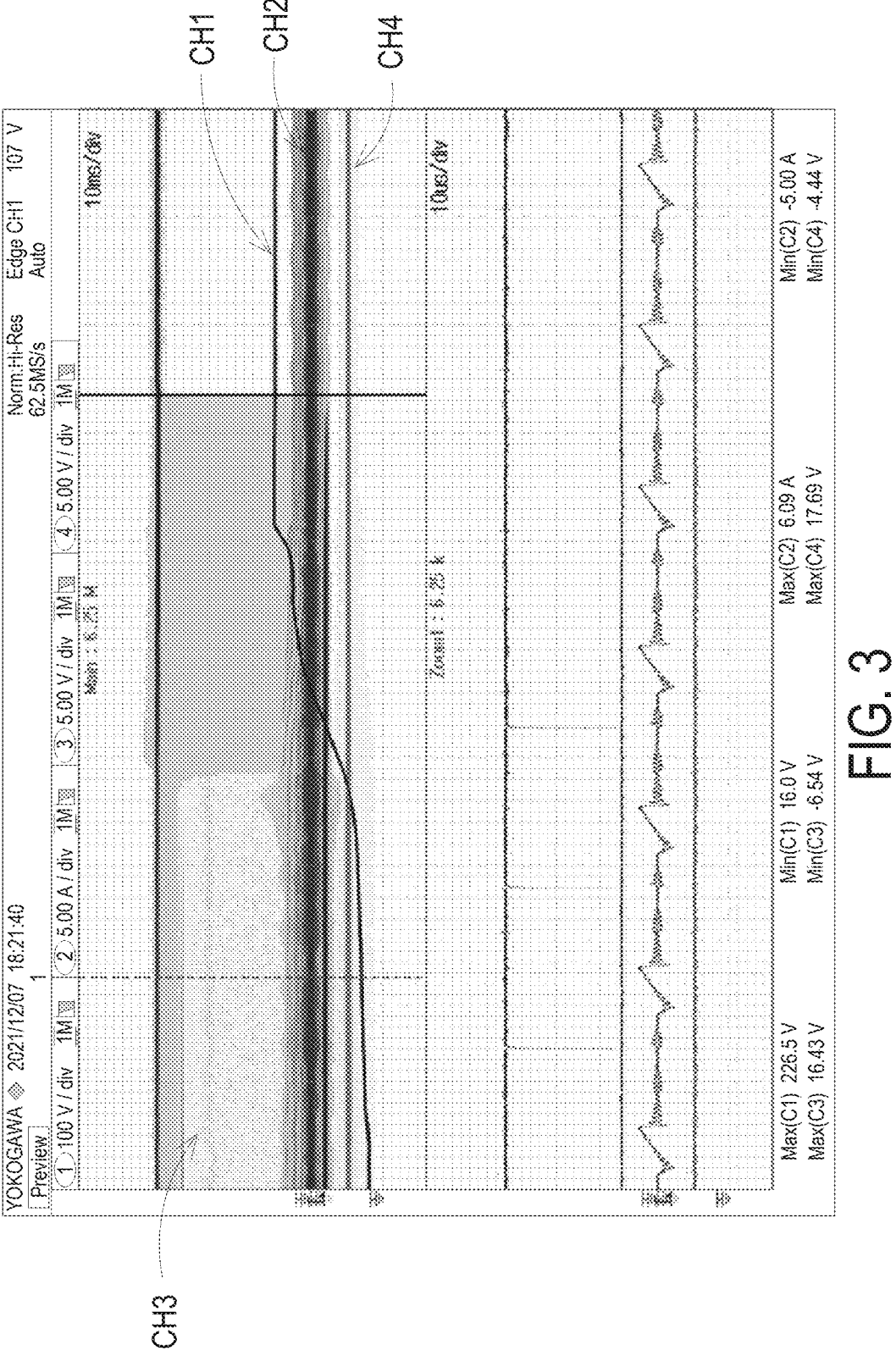
FIG. 3 is a waveform diagram illustrating associated control signals when the DC/DC converter as shown in FIG. 1A is switched from the full-bridge mode to the half-bridge mode and the duty cycle of the control signal for controlling the fourth switch is gradually increased to 100% after the duty cycle of the control signal for controlling the third switch is decreased to zero.

Please refer to FIGS. 1A, 1B, 2A, 2B and 3. FIG. 1A is a schematic circuit diagram illustrating the circuitry topology of a DC/DC converter operating in a full-bridge mode according to a first embodiment of the present disclosure. FIG. 1B is a schematic circuit diagram illustrating the circuitry topology of the DC/DC converter of the first embodiment operating in a half-bridge mode. FIG. 2A is a waveform diagram illustrating associated control signals when the DC/DC converter of the first embodiment is switched from the full-bridge mode to the half-bridge mode. FIG. 2B is a waveform diagram illustrating associated control signals when the DC/DC converter of the first embodiment is switched from the half-bridge mode to the full-bridge mode. FIG. 3 is a waveform diagram illustrating associated control signals when the DC/DC converter of the first embodiment is switched from the full-bridge mode to the half-bridge mode and the duty cycle of the control signal for controlling the fourth switch is gradually increased to 100% after the duty cycle of the control signal for controlling the third switch is decreased to zero.

The present disclosure provides a DC/DC converter. The DC/DC converter can be selectively operated in a full-bridge mode or a half-bridge mode. The DC/DC converter includes a switching circuit, a transformer and a rectifying circuit. The rectifying circuit includes rectifying switches. Generally, in case that the turn ratio of the transformer is fixed, the DC/DC converter in the full-bridge mode is influenced by the stress of the rectifying switches. Consequently, the magnitude of the input voltage received by the DC/DC converter is limited to a certain voltage range. However, in case that the DC/DC converter has the asymmetric half-bridge circuitry topology, the input voltage range of the DC/DC converter can be twice the input voltage range of the full-bridge circuitry topology. In other words, if the DC/DC converter has the asymmetric half-bridge circuitry topology and the DC/DC converter is dynamically switched between the full-bridge mode and the half-bridge mode, the input voltage range of the DC/DC converter can be doubled.

As shown in FIGS. 1A and 1B, the DC/DC converter 1 includes an input terminal, a switching circuit 3, a capacitor C1, a transformer T1 and a control circuit 4.

The input terminal includes an input positive terminal Vin+ and an input negative terminal Vin−. The DC/DC converter 1 receives an input voltage Vin through the input terminal.

The switching circuit 3 is electrically connected with the input terminal. The switching circuit 3 includes a first bridge arm and a second bridge arm, which are electrically connected in parallel. The first bridge arm includes a first switch S1 and a second switch S2, which are electrically connected in series. The second bridge arm includes a third switch S3 and a fourth switch S4, which are electrically connected in series. In some embodiments, the first switch S1, the second switch S2, the third switch S3 and the fourth switch S4 are N-type MOSFET devices. In addition, the switching circuit 3 can be selectively operated in the full-bridge mode as shown in FIG. 1A or in the half-bridge mode as shown in FIG. 1B. Especially, the switching circuit 3 is dynamically switched between the full-bridge mode and the half-bridge mode.

In some embodiments, the capacitor C1 is a blocking capacitor. The first terminal of the blocking capacitor C1 is electrically connected a first node a between the first switch S1 and the second switch S2. The transformer T1 includes a primary winding Np and the secondary winding Ns, which are magnetically coupled with each other. The first terminal of the primary winding Np is electrically connected with the second terminal of the blocking capacitor C1. The second terminal of the primary winding Np is electrically connected with a second node b between the third switch S3 and the fourth switch S4. The secondary winding Ns has a third terminal, a fourth terminal and a center-tap terminal.

The control circuit 4 is electrically connected with the switching circuit 3. For succinctness, the connecting relationships between the control circuit 4 and the switches of the switching circuit 3 are not shown. The control circuit 4 outputs a plurality of control signals to control the operations of the first switch S1, the second switch S2, the third switch S3 and the fourth switch S4.

In order to reduce the volume of the DC/DC converter, reduce the cost of the DC/DC converter and increase the efficiency of the DC/DC converter, it is necessary to reduce the number of high-voltage components in the primary side of the transformer T1. Consequently, the DC/DC converter of the present disclosure is specially designed. When the switching circuit 3 is operated in the half-bridge mode, the circuitry topology in the primary side of the transformer T1 has the asymmetric half-bridge circuitry topology as shown in FIG. 1B. However, during the switching operation of the switching circuit 3 in the asymmetric half-bridge circuitry topology, the blocking capacitor C1 may undergo the charge/discharge action. Consequently, a transformer saturation risk possibly occurs. For solving this problem, the strategies of dynamic and soft switching of the DC/DC converter between the full-bridge mode and the half-bridge mode are designed. The associated control strategies are shown in FIGS. 2A and 2B.

Please refer to FIG. 2A. While the switching circuit 3 is switched from the full-bridge mode to the half-bridge mode, the first switch S1 and the second switch S2 are alternately turned on and turned off under the control of the control circuit 4. Originally, the duty cycle of the control signal for controlling the third switch S3 is synchronized with the duty cycle of the control signal for controlling the second switch S2. Then, the duty cycle of the control signal for controlling the third switch S3 is gradually decreased to zero. The third switch S3 can be turned on only in the time interval when the second switch S2 is turned on. When the duty cycle of the control signal for controlling the third switch S3 is not zero, the duty cycle of the control signal for controlling the fourth switch S4 is synchronized with the duty cycle of the control signal for controlling the first switch S1 under the control of the control circuit 4. After the duty cycle of the control signal for controlling the third switch S3 is decreased to zero, the duty cycle of the control signal for controlling the fourth switch S4 is gradually increased to 100% under the control of the control circuit 4.

Please refer to FIG. 2B. While the switching circuit 3 is switched from the half-bridge mode to the full-bridge mode, the first switch S1 and the second switch S2 are alternately turned on and turned off under the control of the control circuit 4. Originally, the duty cycle of the control signal for controlling the fourth switch S4 is equal to 100%. However, while the switching circuit 3 is switched from the half-bridge mode to the full-bridge mode, the duty cycle of the control signal for controlling the fourth switch S4 is gradually decreased. Then, the duty cycle of the control signal for controlling the fourth switch S4 is synchronized with the duty cycle of the control signal for controlling the first switch S1 under the control of the control circuit 4. After the duty cycle of the control signal for controlling the fourth switch S4 is synchronized with the duty cycle of the control signal for controlling the first switch S1, the duty cycle of the control signal for controlling the third switch S3 is gradually increased from zero. Then, the duty cycle of the control signal for controlling the third switch S3 is synchronized with the duty cycle of the control signal for controlling the second switch S2. Similarly, the third switch S3 can be turned on only in the time interval when the second switch S2 is turned on.

In some embodiments, the timing of switching the operation mode of the switching circuit 3 between the full-bridge mode and the half-bridge mode is determined according to a high-voltage side voltage (i.e., the input voltage Vin) and a set voltage. For example, if the magnitude of a high-voltage side voltage is increased from a low level to the set voltage, the operation mode of the switching circuit 3 is switched from the full-bridge mode to the half-bridge mode. Instead, if the magnitude of a high-voltage side voltage is decreased from a high level to the set voltage, the operation mode of the switching circuit 3 is switched from the half-bridge mode to the full-bridge mode.

In order to avoid the repeated switching action between the half-bridge mode and the full-bridge mode, a hysteresis loop can be disposed in the high voltage side. When the ripple of the input voltage Vin is taken into consideration, the voltage corresponding to the hysteresis loop is about 20V. The set voltage can actually be equal to the input voltage Vin corresponding to the full gain of the switching circuit 3 when the switching circuit 3 is operated in the half-bridge mode. Consequently, the magnitude of the input voltage Vin is determined according to the circuitry topology. For example, when the input voltage Vin is increased from 230V to 800V under the full load condition, the switching circuit 3 in the half-bridge mode needs to be increased to 450V to achieve the full gain. Consequently, the set voltage is 450V.

By using the above control method, the charging problem of the blocking capacitor C1 of the DC/DC converter 1 under the light load condition can be solved. Generally, the current in the primary side of the transformer T1 is low under the light load condition. Consequently, the third switch S3 is turned off, the voltage of the blocking capacitor C1 is not charged to Vin/2. If the fourth switch S4 is normally turned on directly, the voltage of the DC blocking capacitor C1 will be rapidly charged to Vin/2. The higher speed charging action will cause the saturation of the transformer T1 and result in damage of the electronic components. As mentioned above, while the switching circuit 3 is switched from the full-bridge mode to the half-bridge mode, the duty cycle of the control signal for controlling the fourth switch S4 is slowly increased. Since the blocking capacitor C1 is not charged rapidly, the problem of causing the saturation of the transformer T1 will be avoided.

In a simulation experiment, the output terminal of the DC/DC converter 1 is connected with a 20 W load. The simulation results are shown in FIG. 3. In FIG. 3, the first channel CH1 denotes the voltage of the blocking capacitor C1, the second channel CH2 denotes the current of the primary side of the transformer T1, the third channel CH3 denotes the driving waveform of the third switch S3, and the fourth channel CH4 denotes the driving waveform of the fourth switch S4. While the switching circuit 3 is switched from the full-bridge mode to the half-bridge mode, the duty cycle of the control signal for controlling the fourth switch S4 is slowly increased to 100%. During the process of changing the duty cycle of the control signal for controlling the fourth switch S4, the voltage of the blocking capacitor C1 is continuously charged to Vin/2. It is found that the current of the primary side of the transformer T1 is not abruptly increased. In other words, the saturation of the transformer T1 will be avoided.

Please refer to FIG. 1A again. The DC/DC converter 1 further includes an output terminal, a rectifying circuit 5 and an output filtering circuit 6. The output terminal includes an output positive terminal Vo+ and an output negative terminal Vo−. The DC/DC converter 1 outputs an output voltage Vo through the output terminal. The rectifying circuit 5 is electrically connected with the secondary winding Ns. In some embodiments, the rectifying circuit 5 is a synchronous rectifying circuit. The synchronous rectifying circuit includes a first rectifying switch SRA and a second rectifying switch SRB. The first terminal of the first rectifying switch SRA is electrically connected with the third terminal of the secondary winding Ns. The second terminal of the first rectifying switch SRA is electrically connected with the output negative terminal Vo− of the output terminal. The first terminal of the second rectifying switch SRB is electrically connected with the fourth terminal of the secondary winding Ns. The second terminal of the second rectifying switch SRB is electrically connected with the output negative terminal Vo−. The output filtering circuit 6 is electrically connected with the center-tap terminal of the secondary winding Ns, the output positive terminal Vo+ and the output negative terminal Vo−. In some embodiments, the output filtering circuit 6 includes a filtering inductor L and a filtering capacitor Cout.

It is noted that the rectifying circuit is not restricted to the synchronous rectifying circuit as shown in FIG. 1A. For example, the rectifying circuit 5 may be a bridge-type rectifying circuit.

While the operation mode of the DC/DC converter 1 as shown in FIG. 1A is dynamically switched between the full-bridge mode and the half-bridge mode, the blocking capacitor C1 may charge or discharge electricity. If the voltage of the blocking capacitor C1 is high, some problems occur. For example, when the second switch S2 and the third switch S3 are turned on, the input voltage Vin and the voltage of the blocking capacitor C1 are collaboratively applied to the transformer T1. Consequently, the voltage stress of the second rectifying switch SRB is increased. In other words, the switch capable of withstanding a high voltage can be used as the second rectifying switch SRB. Since the second rectifying switch SRB has the high voltage-withstanding capability, the on resistance of the second rectifying switch SRB is increased. In other words, the efficiency of the DC/DC converter 1 is still unsatisfied. For solving the above drawbacks, the voltage of the second rectifying switch SRB needs to be clamped.

Figure 4A:
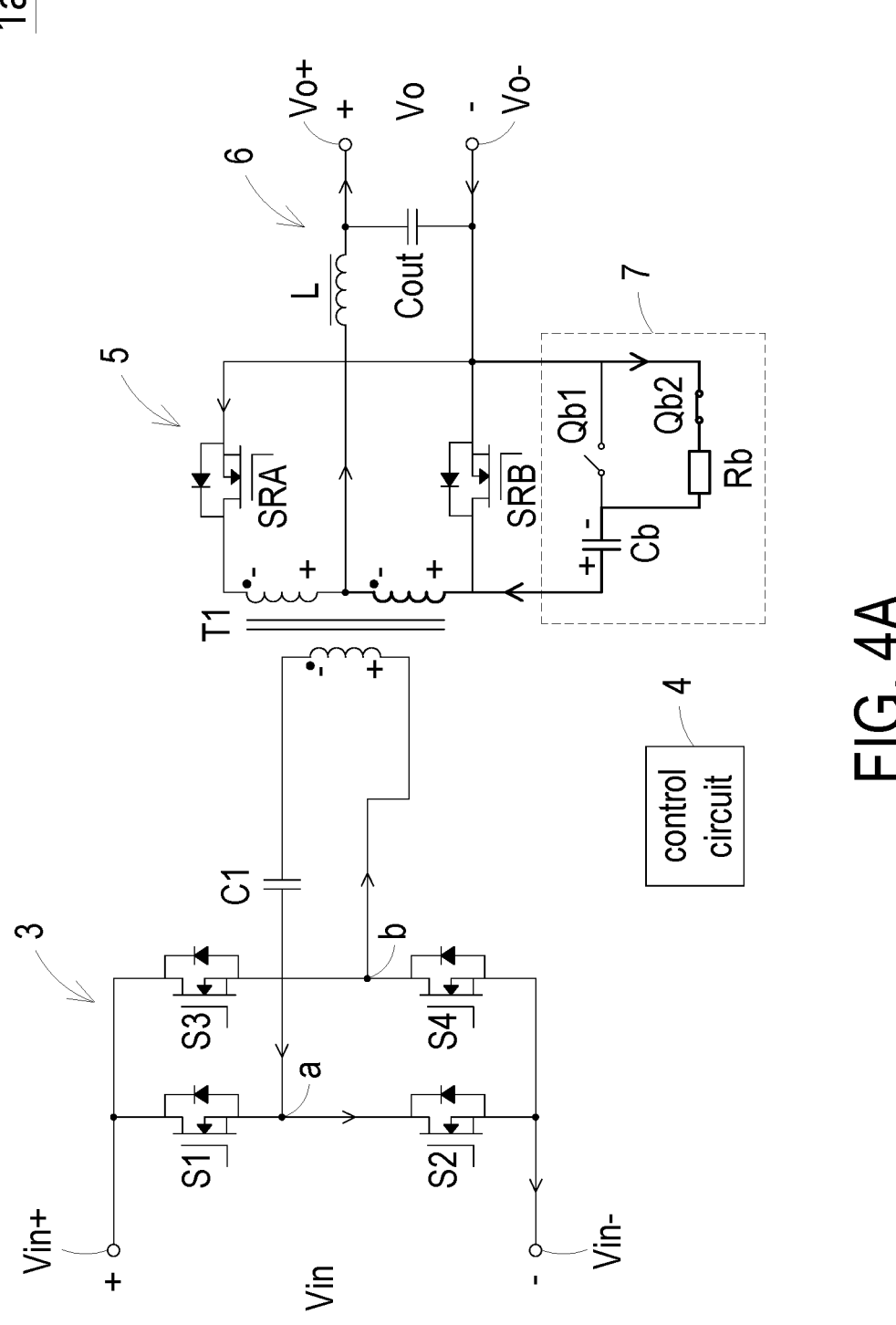
FIG. 4A is a schematic circuit diagram illustrating the circuitry topology of a DC/DC converter according to a second embodiment of the present disclosure.
Figure 4B:
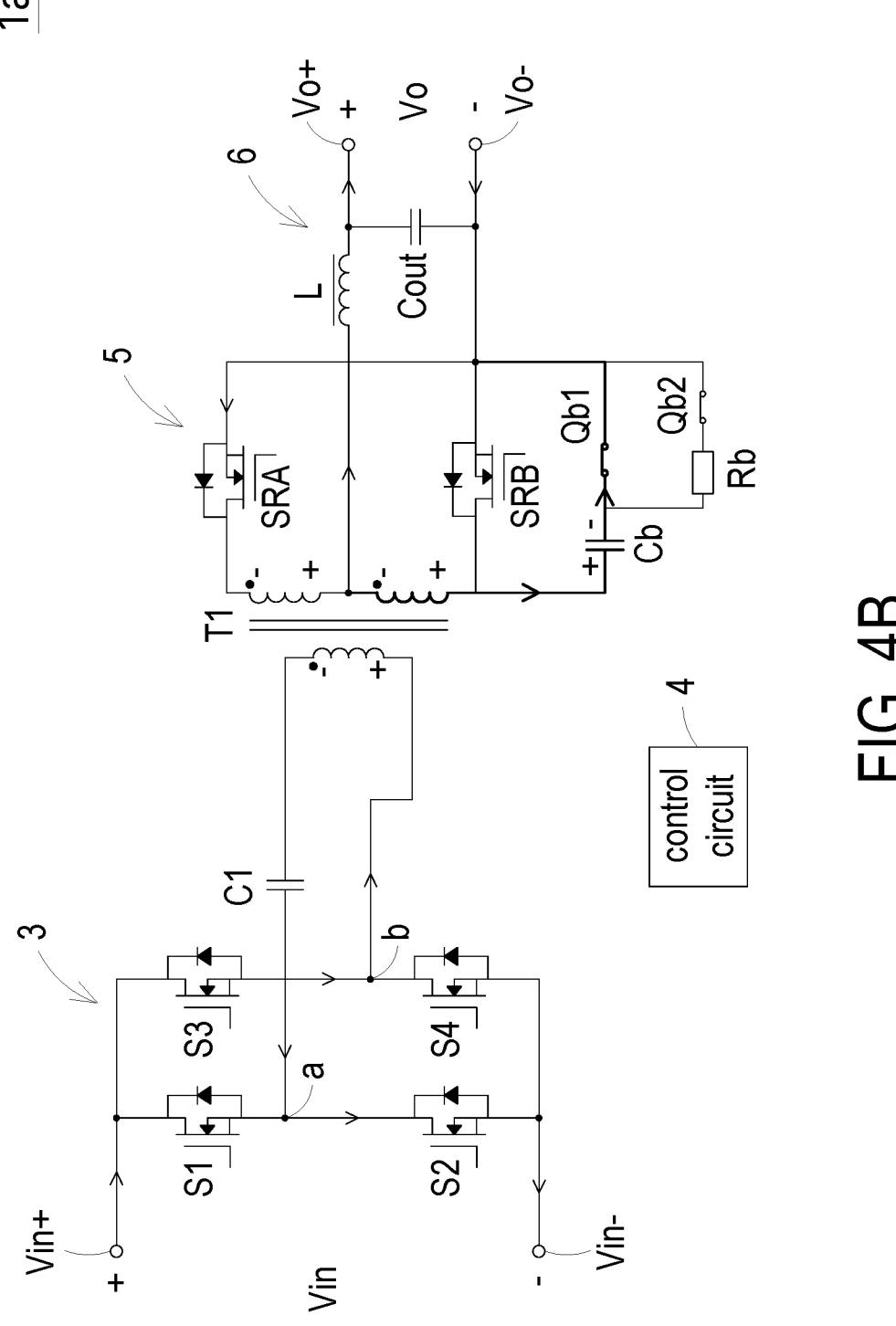
FIG. 4B is a schematic circuit diagram illustrating the charging path of the capacitor clamping circuit in the DC/DC converter as shown in FIG. 4A.
Figure 4C:
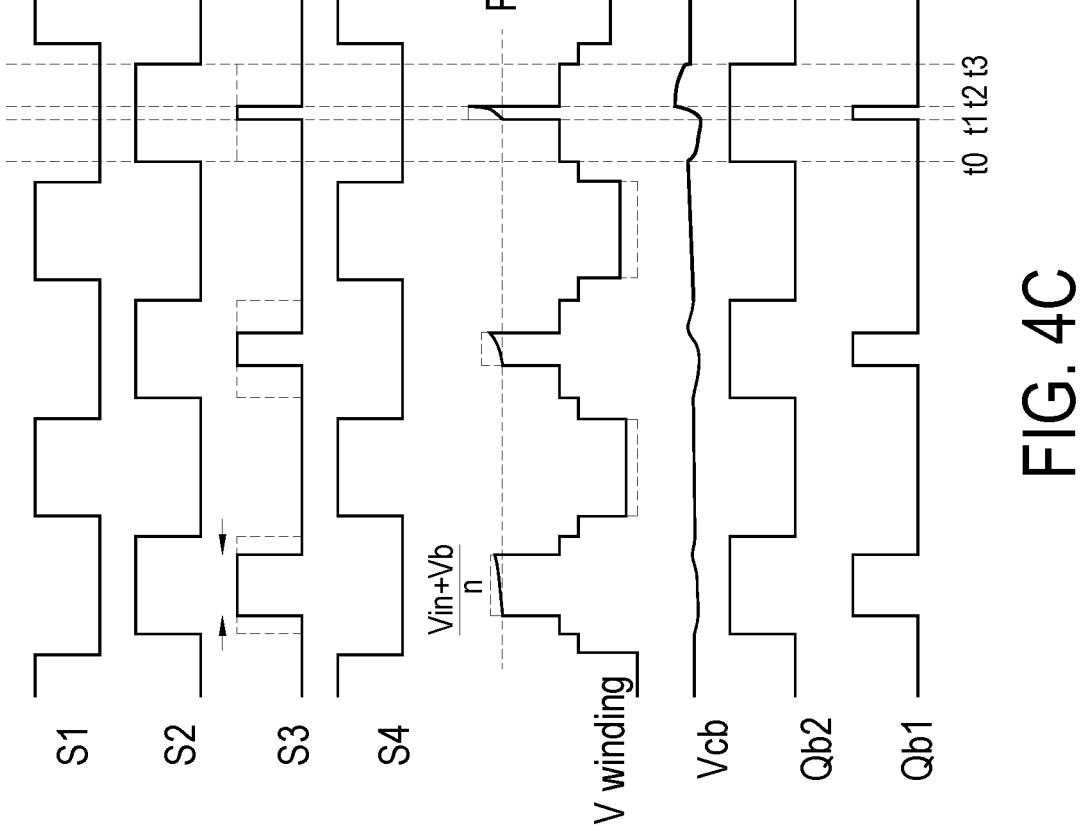
FIG. 4C is a waveform diagram illustrating associated signals of the DC/DC converter as shown in FIG. 4A.

FIG. 4A is a schematic circuit diagram illustrating the circuitry topology of a DC/DC converter according to a second embodiment of the present disclosure, in which the operation mode of the switching circuit of the DC/DC converter is switched between a full-bridge mode and a half-bridge mode. FIG. 4B is a schematic circuit diagram illustrating the charging path of the capacitor clamping circuit in the DC/DC converter as shown in FIG. 4A. FIG. 4C is a waveform diagram illustrating associated signals of the DC/DC converter as shown in FIG. 4A As shown in FIG. 4A, the DC/DC converter 1a further includes a capacitor clamping circuit 7 for clamping the voltage of the second rectifying switch SRB. The capacitor clamping circuit 7 and the second rectifying switch SRB are electrically connected with each other in parallel. In some embodiments, the capacitor clamping circuit 7 includes a clamping capacitor Cb, a controllable switch Qb1, a controllable switch Qb2 and resistor Rb.

The first terminal of the clamping capacitor Cb is electrically connected with the first terminal of the second rectifying switch SRB. The controllable switch Qb1 is electrically connected between the second terminal of the clamping capacitor Cb and the second terminal of the second rectifying switch SRB. Moreover, the controllable switch Qb1 is electrically connected with the control circuit 4. For succinctness, the connecting relationship between the controllable switch Qb1 and the control circuit 4 is not shown. The on/off states of the controllable switch Qb1 are identical to the on/off states of the third switch S3 under the control of the control circuit 4. The first terminal of the resistor Rb is electrically connected with the second terminal of the clamping capacitor Cb. The controllable switch Qb2 is electrically connected between the second terminal of the resistor Rb and the second terminal of the second rectifying switch SRB. Moreover, the controllable switch Qb2 is electrically connected with the control circuit 4. For succinctness, the connecting relationship between the controllable switch Qb2 and the control circuit 4 is not shown. The on/off states of the controllable switch Qb2 are identical to the on/off states of the second switch S2 under the control of the control circuit 4. In some embodiments, the capacitance value of the clamping capacitor Cb is in the range between 15 uF and 30 uF.

Please refer to FIG. 4C. In the time interval between the time point t0 and the time point t1 and in the time interval between the time point t2 and the time point t3, the clamping capacitor Cb discharges electricity. The discharging path is shown in FIG. 4A and indicated by solid lines. In the time interval between the time point t1 and the time point t2, the clamping capacitor Cb is charged. The charging path is shown in FIG. 4B and indicated by solid lines. At the time point t0, the second switch S2 is turned on. At the time point t1, the third switch S3 is turned on. At the time point t2, the third switch S3 is turned off. At the time point t3, the second switch S2 is turned off. In FIG. 4C, Vwinding denotes the voltage of the secondary winding Ns, Vcb is the voltage across two terminals of the clamping capacitor Cb, Vin is the input voltage, and Vb is the voltage between the first terminal and the second terminal of the second rectifying switch SRB.

In the circuitry topology of the DC/DC converter as shown in FIG. 1A, the voltage stress of the second rectifying switch SRB is equal to Vin+Vb. However, the DC/DC converter 1a as shown in FIG. 4A further includes the capacitor clamping circuit 7. Consequently, a resonance between the clamping capacitor Cb of the capacitor clamping circuit 7 and the leakage inductor of the transformer is generated. Due to the resonance, the voltage stress of the second rectifying switch SRB is clamped, and the rise speed and the peak value of the voltage stress of the second rectifying switch SRB are decreased. Consequently, the voltage stress of the second rectifying switch SRB in the DC/DC converter 1a is decreased to be lower than Vin+Vb. For example, the voltage stress is lower than the peak value P of the voltage Vwinding of the secondary winding Ns. Moreover, if the inductance of the leakage inductor of the transformer is not large enough, an additional inductor with a small inductance may be serially connected with the transformer to generate the resonance.

Figure 5A:
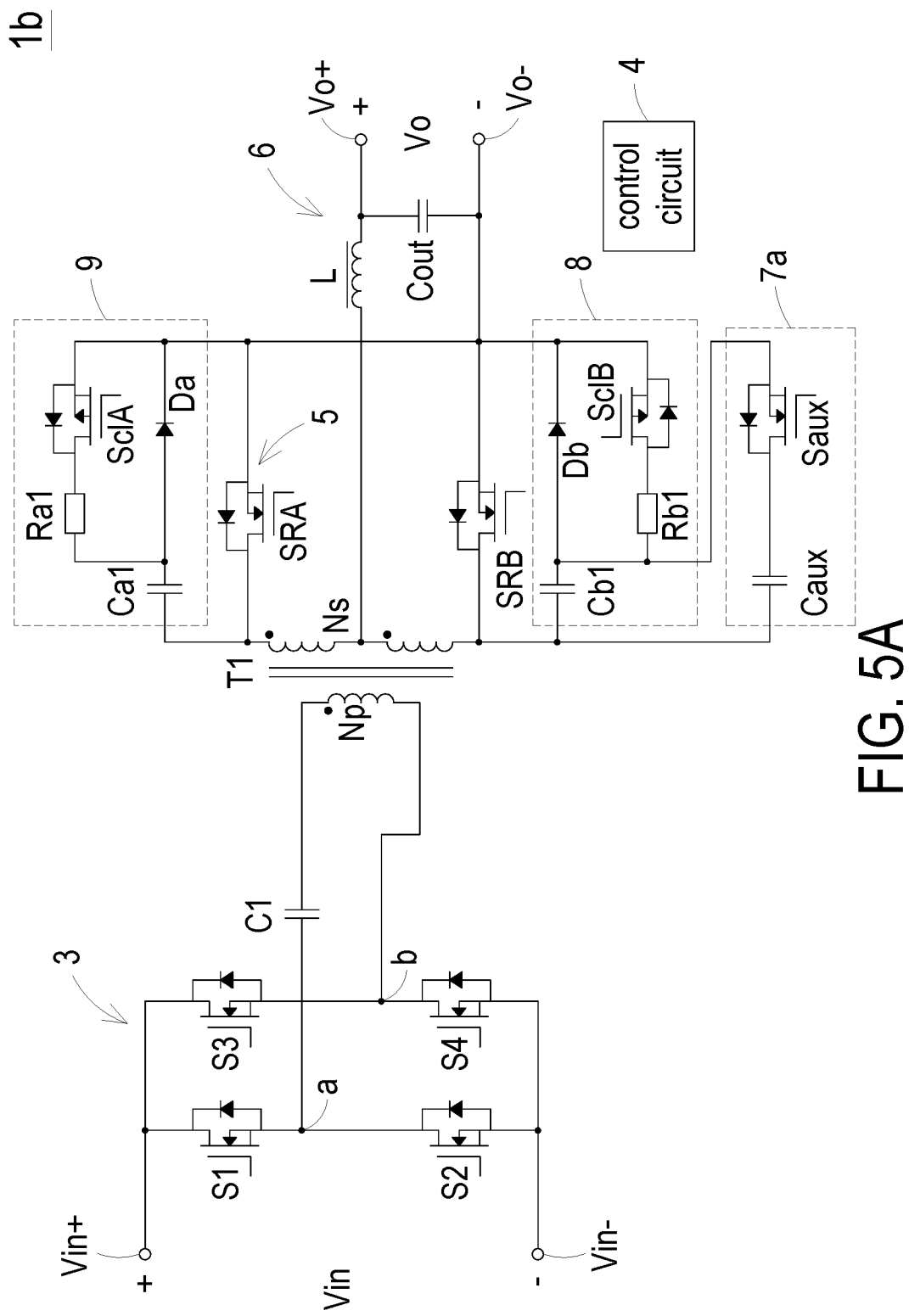
FIG. 5A is a schematic circuit diagram illustrating the circuitry topology of a DC/DC converter operating in a full-bridge mode according to a third embodiment of the present disclosure.
Figure 5B:
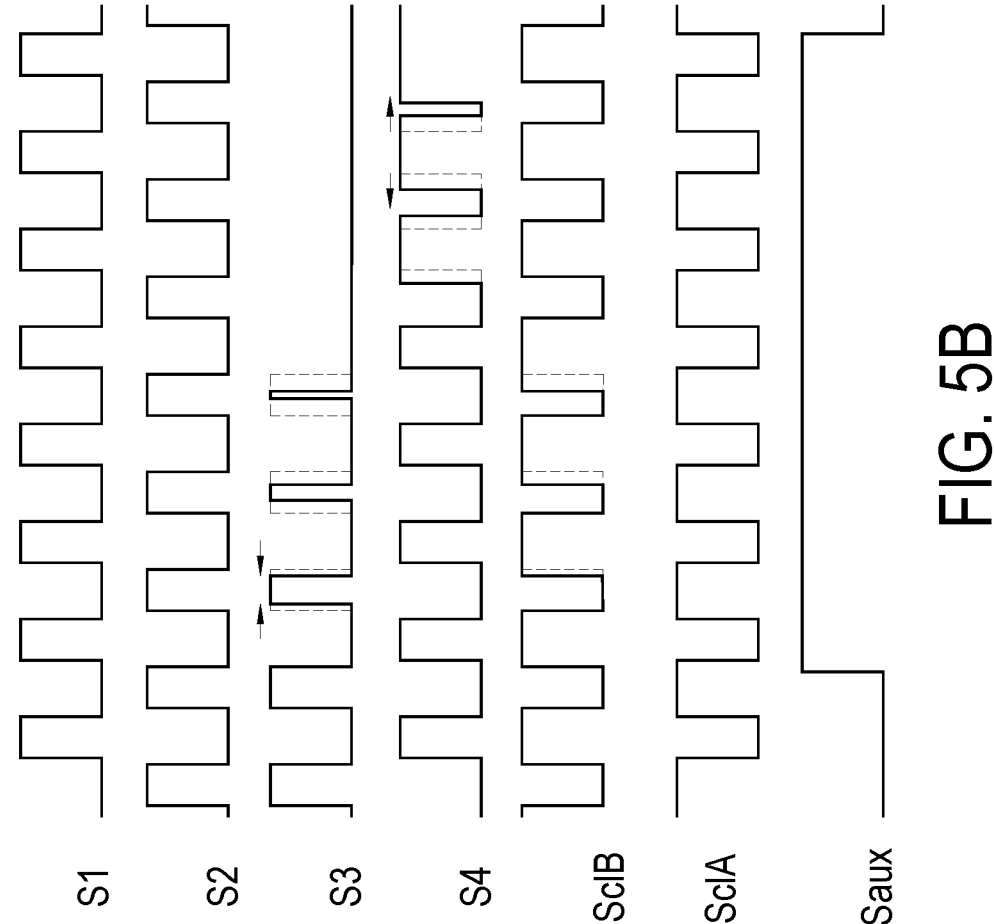
FIG. 5B is a waveform diagram illustrating associated control signals when the DC/DC converter as shown in FIG. 5A is switched from the full-bridge mode to the half-bridge mode.
Figure 5C:
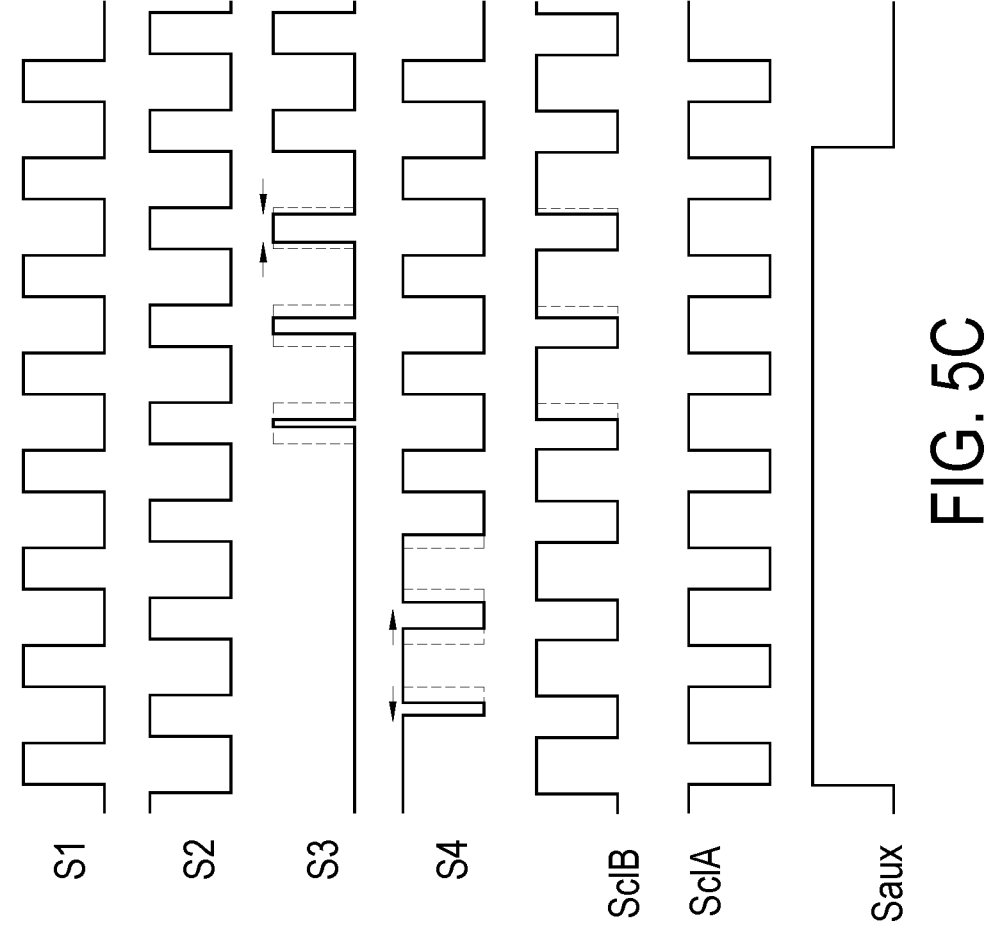
FIG. 5C is a waveform diagram illustrating associated control signals when the DC/DC converter as shown in FIG. 5A is switched from the half-bridge mode to the full-bridge mode.

FIG. 5A is a schematic circuit diagram illustrating the circuitry topology of a DC/DC converter operating in a full-bridge mode according to a third embodiment of the present disclosure. FIG. 5B is a waveform diagram illustrating associated control signals when the DC/DC converter of the third embodiment is switched from the full-bridge mode to the half-bridge mode. FIG. 5C is a waveform diagram illustrating associated control signals when the DC/DC converter of the third embodiment is switched from the half-bridge mode to the full-bridge mode.

The circuitry topology and the operations of the DC/DC converter 1b of this embodiment are similar to those of the DC/DC converter 1a as shown in FIG. 4A. In comparison with the DC/DC converter 1a, the DC/DC converter 1b of this embodiment further includes a first active clamping circuit 8 and a second active clamping circuit 9.

The first active clamping circuit 8 and the second rectifying switch SRB are electrically connected with each other in parallel. The first active clamping circuit 8 is used for clamping the voltage spike of the second rectifying switch SRB in order to reduce the voltage stress of the second rectifying switch SRB. In some embodiments, the first active clamping circuit 8 includes a first clamping capacitor Cb1, a first diode Db, a resistor Rb1 and a controllable switch Sc1B. The first switch S1, the second switch S2, the third switch S3 and the fourth switch S4 are N-type MOSFET devices, and the controllable switch Sc1B is a P-type MOS-FET device. In other words, the first switch S1, the second switch S2, the third switch S3 and the fourth switch S4 are turned on in response to the high levels of the corresponding control signals, and the controllable switch Sc1B is turned on according to the low level of the corresponding control signal. That is, the polarities of the control signals for controlling the first switch S1, the second switch S2, the third switch S3 and the fourth switch S4 to turn on and the polarity of the control signal for control the controllable switch Sc1B to turn on are opposite.

The first terminal of the first clamping capacitor Cb1 is electrically connected with the first terminal of the second rectifying switch SRB. The anode of the first diode Db is electrically connected with the second terminal of the first clamping capacitor Cb1. The cathode of the first diode Db is electrically connected with the second terminal of the second rectifying switch SRB. The first terminal of the resistor Rb1 is electrically connected with the second terminal of the first clamping capacitor Cb1. The first terminal of the resistor Rb1 is electrically connected with the second terminal of the first clamping capacitor. The controllable switch Sc1B is electrically connected between the second terminal of the resistor Rb1 and the second terminal of the second rectifying switch SRB. Moreover, the controllable switch Sc1B is electrically connected with the control circuit 4. For succinctness, the connecting relationship between the controllable switch Sc1B and the control circuit 4 is not shown. The controllable switch Sc1B is controlled by the control circuit 4.

Please also refer to FIGS. 5B and 5C. The controllable switch Sc1B and the second switch S2 are turned on at the same time under the control of the control circuit 4. The controllable switch Sc1B and the third switch S3 are turned off at the same time when the third switch S3 is not zero. In other words, the time points of turning on the controllable switch Sc1B are corresponding to the time points of turning on the second switch S2, and the time points of turning off the controllable switch Sc1B are corresponding to the time points of turning off the third switch S3. Moreover, the MOSFET type of the controllable switch Sc1B is opposite to the MOSFET type of the second switch S2 or the third switch S3. Consequently, the second switch S2 and the third switch S3 are turned on in response to the high levels of the corresponding control signals, and the controllable switch Sc1B is turned on according to the low level of the corresponding control signal.

The second active clamping circuit 9 and the first rectifying switch SRA are electrically connected with each other in parallel. The second active clamping circuit 9 is used for clamping the voltage spike of the first rectifying switch SRA in order to reduce the voltage stress of the first rectifying switch SRA. Moreover, the second active clamping circuit 9 includes a first clamping capacitor Ca1, a first diode Da, a resistor Ra1 and a controllable switch Sc1A. The first terminal of the first clamping capacitor Ca1 is electrically connected with the first terminal of the first rectifying switch SRA. The anode of the first diode Da is electrically connected with the second terminal of the first clamping capacitor Ca1. The cathode of the first diode Da is electrically connected with the second terminal of the first rectifying switch SRA. The first terminal of the resistor Ra1 is electrically connected with the second terminal of the first clamping capacitor Ca1. The controllable switch Sc1A is electrically connected between the second terminal of the resistor Ra1 and the second terminal of the first rectifying switch SRA. Moreover, the controllable switch Sc1A is electrically connected with the control circuit 4. For succinctness, the connecting relationship between the controllable switch Sc1A and the control circuit 4 is not shown. The controllable switch Sc1A is controlled by the control circuit 4. Moreover, the controllable switch Sc1A and the first switch S1 are turned on at the same time under the control of the control circuit 4, and the controllable switch Sc1A and the first switch S1 are turned off at the same time under the control of the control circuit 4. In some embodiments, the controllable switch Sc1A is a P-type MOSFET. In other words, the controllable switch Sc1A of the second active clamping circuit 9 is turned on according to the low level of the corresponding control signal.

Like the example of FIG. 4A, the DC/DC converter 1b of this embodiment further includes a capacitor clamping circuit 7a. While the operation mode is dynamically switched between the full-bridge mode and the half-bridge mode, the voltage of the second rectifying switch SRB is clamped by the capacitor clamping circuit 7a. As shown in FIG. 5A, the first terminal of the capacitor clamping circuit 7a is connected with the first terminal of the first clamping capacitor Cb1 of the first active clamping circuit 8, and the second terminal of the capacitor clamping circuit 7a is connected with the second terminal of the first clamping capacitor Cb1. In some embodiments, the capacitor clamping circuit 7a includes a second clamping capacitor Caux and a controllable switch Saux. For example, the controllable switch Saux is an N-type MOSFET device. In other words, the controllable switch Saux is turned on according to the high level of the corresponding control signal. The first terminal of the second clamping capacitor Caux is electrically connected with the first terminal of the first clamping capacitor Cb1 of the first active clamping circuit 8. The controllable switch Saux is electrically connected between the second terminal of the second clamping capacitor Caux and the second terminal of the first clamping capacitor Cb1 of the first active clamping circuit 8. Moreover, the controllable switch Saux is electrically connected with the control circuit 4. For succinctness, the connecting relationship between the controllable switch Saux and the control circuit 4 is not shown. The controllable switch Saux is controlled by the control circuit 4.

While the switching circuit 3 is switched from the full-bridge mode to the half-bridge mode, the waveforms of the control signals for controlling associated switches are shown in FIG. 5B. Before the duty cycle of the control signal for controlling the third switch S3 starts to be decreased, the controllable switch Saux is turned on under the control of the control circuit 4. After the duty cycle of the control signal for controlling the fourth switch S4 is changed to 100%, the controllable switch Saux is turned off under the control of the control circuit 4.

While the switching circuit 3 is switched from the half-bridge mode to the full-bridge mode, the waveforms of the control signals for controlling associated switches are shown in FIG. 5C. Before the duty cycle of the control signal for controlling the fourth switch S4 starts to be decreased from 100%, the controllable switch Saux is turned on under the control of the control circuit 4. After the duty cycle of the control signal for controlling the third switch S3 is synchronized with the duty cycle of the control signal for controlling the second switch S2, the controllable switch Saux is turned off under the control of the control circuit 4. Moreover, a time point at which the controllable switch Saux starts to turn on is synchronized with a time point at which the controllable switch Sc1B is switched from off to on.

In this embodiment, the DC/DC converter 1b includes the first active clamping circuit 8, the second active clamping circuit 9 and the capacitor clamping circuit 7a. When the switching circuit 3 is in the steady state, the first active clamping circuit 8 and the second active clamping circuit 9 are used for clamping the voltage spike of the second rectifying switch SRB and the voltage spike of the first rectifying switch SRA, respectively. While the operation mode of the switching circuit 3 is dynamically and softly switched between the full-bridge mode and the half-bridge mode, the voltage stress of the second rectifying circuit SRB is clamped by the capacitor clamping circuit 7a. Consequently, when the switching circuit 3 is in the steady state, the power loss of the DC/DC converter 1b is reduced.

In some embodiments, the output terminal of the DC/DC converter 1b is connected with a 500 W load. In case that the DC/DC converter 1b is equipped with the first active clamping circuit 8 and the second active clamping circuit 9 but the DC/DC converter 1b is not equipped with the capacitor clamping circuit 7a, the voltage stress of the second rectifying switch SRB and the first rectifying switch SRA is decreased to 119V. In case that the DC/DC converter 1b includes the first active clamping circuit 8, the second active clamping circuit 9 and the capacitor clamping circuit 7a, the voltage stress of the second rectifying switch SRB is further decreased to 85.2V.

Figure 6:
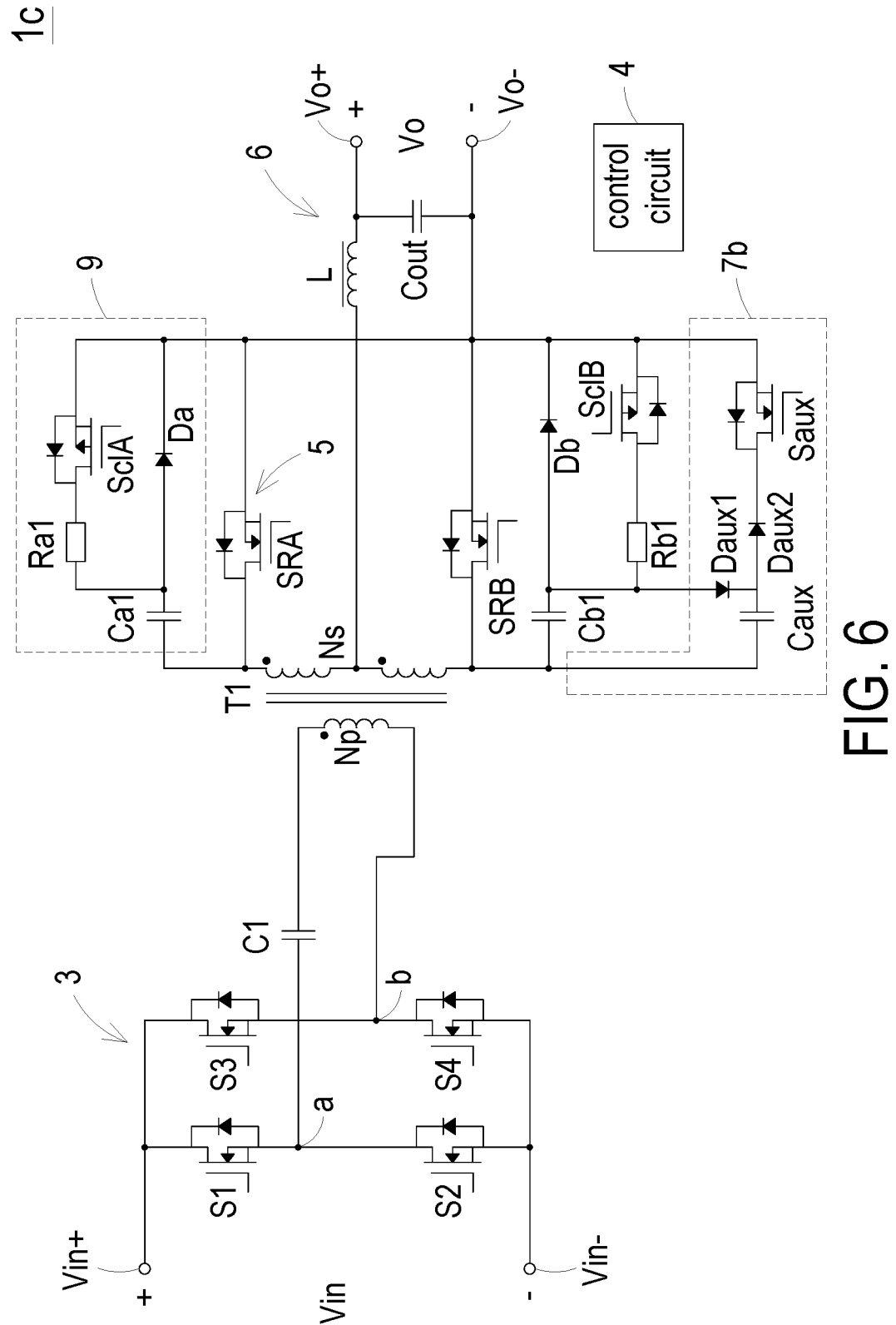
FIG. 6 is a schematic circuit diagram illustrating the circuitry topology of a DC/DC converter according to a fourth embodiment of the present disclosure.

FIG. 6 is a schematic circuit diagram illustrating the circuitry topology of a DC/DC converter according to a fourth embodiment of the present disclosure. Compared with the DC/DC converter 1b as shown in FIG. 5A, the capacitor clamping circuit 7b of the DC/DC converter 1c of this embodiment includes a second clamping capacitor Caux, a second diode Daux1, a third diode Daux2 and a controllable switch Saux.

The first terminal of the second clamping capacitor Caux is electrically connected with the first terminal of the first clamping capacitor Cb1 of the first active clamping circuit 8. The anode of the second diode Daux1 is electrically connected with the second terminal of the first clamping capacitor Cb1 and the first terminal of the resistor Rb1 of the first active clamping circuit 8. The cathode of the second diode Daux1 is electrically connected with the second terminal of the second clamping capacitor Caux. The anode of the third diode Daux2 is electrically connected with the second terminal of the second clamping capacitor Caux and the cathode of the second diode Daux1. The controllable switch Saux is electrically connected between the cathode of the third diode Daux2 and the second terminal of the second rectifying switch SRB. Moreover, the controllable switch Saux is electrically connected with the control circuit 4. For succinctness, the connecting relationship between the controllable switch Saux and the control circuit 4 is not shown. The controllable switch Saux is controlled by the control circuit 4.

The control strategies of the DC/DC converter 1c are similar to those as shown in FIGS. 5B and 5C. While the switching circuit 3 is switched from the full-bridge mode to the half-bridge mode, the waveforms of the control signals for controlling associated switches are shown in FIG. 5B. Before the duty cycle of the control signal for controlling the third switch S3 starts to be decreased, the controllable switch Saux is turned on under the control of the control circuit 4. After the duty cycle of the control signal for controlling the fourth switch S4 is changed to 100%, the controllable switch Saux is turned off under the control of the control circuit 4. While the switching circuit 3 is switched from the half-bridge mode to the full-bridge mode, the waveforms of the control signals for controlling associated switches are shown in FIG. 5C. Before the duty cycle of the control signal for controlling the fourth switch S4 starts to be decreased from 100%, the controllable switch Saux is turned on under the control of the control circuit 4. After the duty cycle of the control signal for controlling the third switch S3 is synchronized with the duty cycle of the control signal for controlling the second switch S2, the controllable switch Saux is turned off under the control of the control circuit 4. Moreover, a time point at which the controllable switch Saux starts to turn on is synchronized with a time point at which the controllable switch Sc1B is switched from off to on.

In the above embodiments, the capacitance value of the second clamping capacitor Caux in the capacitor clamping circuit 7a as shown in FIG. 5A and the capacitance value of the second clamping capacitor Caux in the capacitor clamping circuit 7b as shown in FIG. 6 are in a range between 15 uF and 30 uF. Moreover, the capacitance value of the first clamping capacitor Cb1 in the first active clamping circuit 8 is lower than the capacitance value of the second clamping capacitor Caux.

The present disclosure further provides a control method. The control method can be applied to the control circuit 4 of the DC/DC converter 1, 1a, 1b or 1c.

Originally, the duty cycle of the control signal for controlling the third switch S3 is synchronized with the duty cycle of the control signal for controlling the second switch S2. While the switching circuit 3 is switched from the full-bridge mode to the half-bridge mode, the duty cycle of the control signal for controlling the third switch S3 is gradually decreased to zero. When the duty cycle of the control signal for controlling the third switch S3 is not zero, the duty cycle of the control signal for controlling the fourth switch S4 is synchronized with the duty cycle of the control signal for controlling the first switch S1 under the control of the control circuit 4. After the duty cycle of the control signal for controlling the third switch S3 is decreased to zero, the duty cycle of the control signal for controlling the fourth switch S4 is gradually increased to 100% under the control of the control circuit 4. Moreover, the third switch S3 can be turned on only in the time interval when the second switch S2 is turned on.

While the switching circuit 3 is switched from the half-bridge mode to the full-bridge mode, the duty cycle of the control signal for controlling the fourth switch S4 is gradually decreased from 100%. Then, the duty cycle of the control signal for controlling the fourth switch S4 is synchronized with the duty cycle of the control signal for controlling the first switch S1 under the control of the control circuit 4. After the duty cycle of the control signal for controlling the fourth switch S4 is synchronized with the duty cycle of the control signal for controlling the first switch S1, the duty cycle of the control signal for controlling the third switch S3 is gradually increased from zero. Then, the duty cycle of the control signal for controlling the third switch S3 is synchronized with the duty cycle of the control signal for controlling the second switch S2. Similarly, the third switch S3 can be turned on only in the time interval when the second switch S2 is turned on.

Moreover, when the control method of the present disclosure is applied to the DC/DC converter 1a as shown in FIG. 4A, the control method is modified. For example, the controllable switch Qb1 is turned on or turned off synchronously with the third switch S3 under the control of the control circuit 4, and the controllable switch Qb2 is turned on or turned off synchronously with the second switch S2 under the control of the control circuit 4.

Moreover, when the control method of the present disclosure is applied to the DC/DC converter 1b as shown in FIG. 5A, the control method is modified. The controllable switch Sc1B is turned on synchronously with the second switch S2 under the control of the control circuit 4. The controllable switch Sc1B is turned off synchronously with the third switch S3 under the control of the control circuit 4. The on/off state of the controllable switch Sc1B are controlled by the control circuit 4. While the switching circuit 3 is switched from the full-bridge mode to the half-bridge mode, the waveforms of the control signals for controlling associated switches are shown in FIG. 5B. Before the duty cycle of the control signal for controlling the third switch S3 starts to be decreased, the controllable switch Saux is turned on under the control of the control circuit 4. After the duty cycle of the control signal for controlling the fourth switch S4 is changed to 100%, the controllable switch Saux is turned off under the control of the control circuit 4. While the switching circuit 3 is switched from the half-bridge mode to the full-bridge mode, the waveforms of the control signals for controlling associated switches are shown in FIG. 5C. Before the duty cycle of the control signal for controlling the fourth switch S4 starts to be decreased from 100%, the controllable switch Saux is turned on under the control of the control circuit 4. After the duty cycle of the control signal for controlling the third switch S3 is synchronized with the duty cycle of the control signal for controlling the second switch S2, the controllable switch Saux is turned off under the control of the control circuit 4. Moreover, a time point at which the controllable switch Saux is turned on is synchronized with a time point at which the controllable switch Sc1B is switched from off to on.

Moreover, when the control method of the present disclosure is applied to the DC/DC converter 1c as shown in FIG. 6, the control method is modified. The on/off state of the controllable switch Sc1B are controlled by the control circuit 4. While the switching circuit 3 is switched from the full-bridge mode to the half-bridge mode, the waveforms of the control signals for controlling associated switches are shown in FIG. 5B. Before the duty cycle of the control signal for controlling the third switch S3 starts to be decreased, the controllable switch Saux is turned on under the control of the control circuit 4. After the duty cycle of the control signal for controlling the fourth switch S4 is changed to 100%, the controllable switch Saux is turned off under the control of the control circuit 4. While the switching circuit 3 is switched from the half-bridge mode to the full-bridge mode, the waveforms of the control signals for controlling associated switches are shown in FIG. 5C. Before the duty cycle of the control signal for controlling the fourth switch S4 starts to be decreased from 100%, the controllable switch Saux is turned on under the control of the control circuit 4. After the duty cycle of the control signal for controlling the third switch S3 is synchronized with the duty cycle of the control signal for controlling the second switch S2, the controllable switch Saux is turned off under the control of the control circuit 4. Moreover, a time point at which the controllable switch Saux is turned on is synchronized with a time point at which the controllable switch Sc1B is switched from off to on.

From the above descriptions, the present disclosure provides a DC/DC converter and a control method of the DC/DC converter. The DC/DC converter includes a full-bridge circuitry topology and an asymmetric half-bridge circuitry topology. The operation mode of the DC/DC converter can be dynamically and softly switched between a full-bridge mode and a half-bridge mode. The input voltage range of the DC/DC converter is wide. The control strategies of the DC/DC converter are specially designed. Since the blocking capacitor is not charged too fast, the saturation of the transformer will be avoided. Moreover, the voltage stress of the second rectifying switch is clamped by the capacitor clamping circuit of the DC/DC converter, the efficiency of the DC/DC converter is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A DC/DC converter, comprising:

an input terminal;

a switching circuit electrically connected with the input terminal, and comprising a first bridge arm and a second bridge arm connected in parallel, wherein the first bridge arm comprises a first switch and a second switch connected in series, and the second bridge arm comprises a third switch and a fourth switch connected in series, wherein the switching circuit selectively operates in a full-bridge mode or in a half-bridge mode;

a capacitor comprising a first terminal and a second terminal, wherein the first terminal of the capacitor is electrically connected with a first node between the first switch and the second switch;

a transformer comprising a primary winding, wherein the primary winding is electrically connected with the second terminal of the capacitor and a second node between the third switch and the fourth switch; and a control circuit generating a plurality of control signals for controlling operations of the switching circuit, wherein while the switching circuit is switched from the full-bridge mode to the half-bridge mode, the first switch and the second switch are alternately turned on and turned off under the control of the control circuit, and a duty cycle of the control signal for controlling the third switch that is originally synchronized with a duty cycle of the control signal for controlling the second switch is gradually decreased to zero under the control of the control circuit, wherein when the duty cycle of the control signal for controlling the third switch is not zero, a duty cycle of the control signal for controlling the fourth switch is synchronized with a duty cycle of the control signal for controlling the first switch under the control of the control circuit, wherein after the duty cycle of the control signal for controlling the third switch is changed to zero, the duty cycle of the control signal for controlling the fourth switch is gradually increased to 100% under the control of the control circuit, wherein while the switching circuit is switched from the half-bridge mode to the full-bridge mode, the first switch and the second switch are alternately turned on and turned off under control of the control circuit, and the duty cycle of the control signal for controlling the fourth switch that is originally equal to 100% is gradually decreased to be synchronized with the duty cycle of the control signal for controlling the first switch under the control of the control circuit, wherein after the duty cycle of the control signal for controlling the fourth switch is synchronized with the duty cycle of the control signal for controlling the first switch, the duty cycle of the control signal for controlling the third switch is gradually increased from zero to be synchronized with the duty cycle of the control signal for controlling the second switch, wherein the third switch is turned on only in a time interval when the second switch is turned on.

2. The DC/DC converter according to claim 1, wherein the transformer further comprises a secondary winding comprising a third terminal, a fourth terminal and a center-tap terminal, and the DC/DC converter further comprises:

an output terminal;

a rectifying circuit electrically connected with the secondary winding, and comprising a first rectifying switch and a second rectifying switch, wherein a first terminal of the first rectifying switch is electrically connected with the third terminal of the secondary winding, a second terminal of the first rectifying switch is electrically connected with an output negative terminal of the output terminal, a first terminal of the second rectifying switch is electrically connected with the fourth terminal of the secondary winding, and a second terminal of the second rectifying switch is electrically connected with the output negative terminal of the output terminal; and an output filtering circuit electrically connected with the center-tap terminal, an output positive terminal of the output terminal and the output negative terminal of the output terminal.

3. The DC/DC converter according to claim 2, wherein the DC/DC converter comprises a capacitor clamping circuit, wherein the capacitor clamping circuit and the second rectifying switch are connected with each other in parallel, and the capacitor clamping circuit comprises:

a clamping capacitor comprising a first terminal and a second terminal, wherein the first terminal of the clamping capacitor is electrically connected with the first terminal of the second rectifying switch;

a first controllable switch electrically connected between the second terminal of the clamping capacitor and the second terminal of the second rectifying switch, wherein the first controllable switch and the third switch are turned on or turned off synchronously under the control of the control circuit;

a resistor comprising a first terminal and a second terminal, wherein the first terminal of the resistor is electrically connected with the second terminal of the clamping capacitor; and a second controllable switch electrically connected between the second terminal of the resistor and the second terminal of the second rectifying switch, wherein the second controllable switch and the second switch are turned on or turned off synchronously under the control of the control circuit.

4. The DC/DC converter according to claim 3, wherein a capacitance value of the clamping capacitor is in a range between 15 uF and 30 uF.

5. The DC/DC converter according to claim 2, wherein the DC/DC converter further comprises an active clamping circuit, wherein the active clamping circuit and the second rectifying switch are electrically connected with each other in parallel, and the active clamping circuit comprises:

a first clamping capacitor comprising a first terminal and a second terminal, wherein the first terminal of the first clamping capacitor is electrically connected with the first terminal of the second rectifying switch;

a first diode, wherein an anode of the first diode is electrically connected with the second terminal of the first clamping capacitor, and a cathode of the first diode is electrically connected with the second terminal of the second rectifying switch;

a resistor comprising a first terminal and a second terminal, wherein the first terminal of the resistor is electrically connected with the second terminal of the first clamping capacitor; and a first controllable switch electrically connected between the second terminal of the resistor and the second terminal of the second rectifying switch, wherein the first controllable switch is turned on synchronously with the second switch and turned off synchronously with the third switch under the control of the control circuit.

6. The DC/DC converter according to claim 5, wherein the first switch, the second switch, the third switch and the fourth switch are N-type MOSFET devices, and the first controllable switch is a P-type MOSFET device.

7. The DC/DC converter according to claim 5, wherein the DC/DC converter further comprises a capacitor clamping circuit, wherein the capacitor clamping circuit and the first clamping capacitor are electrically connected in parallel, and the capacitor clamping circuit comprises:

a second clamping capacitor comprising a first terminal and a second terminal, wherein the first terminal of the second clamping capacitor is electrically connected with the first terminal of the first clamping capacitor; and a second controllable switch electrically connected between the second terminal of the second clamping capacitor and the second terminal of the first clamping capacitor, wherein the second controllable switch is controlled by the control circuit, wherein the first controllable switch is turned on and turned off under the control of the control circuit, wherein while the switching circuit is switched from the full-bridge mode to the half-bridge mode, the second controllable switch is turned on at a time point before the duty cycle of the control signal for controlling the third switch synchronized with the duty cycle of the control signal for controlling the second switch starts to be changed, and the second controllable switch is turned off at a time point after the duty cycle of the control signal for controlling the fourth switch is changed to 100%, wherein while the switching circuit is switched from the half-bridge mode to the full-bridge mode, the second controllable switch is turned on at a time point before the duty cycle of the control signal for controlling the fourth switch starts to be decreased from 100%, and the second controllable switch is turned off at a time point after the duty cycle of the control signal for controlling the third switch is synchronized with the duty cycle of the control signal for controlling the second switch, wherein a time point at which the second controllable switch is turned on is synchronized with a time point at which the first controllable switch is switched from off to on.

8. The DC/DC converter according to claim 7, wherein the first switch, the second switch, the third switch, the fourth switch and the second controllable switch are N-type MOSFET devices, and the first controllable switch is a P-type MOSFET device.

9. The DC/DC converter according to claim 7, wherein a capacitance value of the second clamping capacitor is in a range between 15 uF and 30 uF.

10. The DC/DC converter according to claim 7, wherein a capacitance value of the first clamping capacitor is lower than a capacitance value of the second clamping capacitor.

11. The DC/DC converter according to claim 5, wherein the DC/DC converter further comprises a capacitor clamping circuit, and the capacitor clamping circuit comprises:

a second clamping capacitor comprising a first terminal and a second terminal, wherein the first terminal of the second clamping capacitor is electrically connected with the first terminal of the first clamping capacitor;

a second diode, wherein an anode of the second diode is electrically connected with the second terminal of the first clamping capacitor and the first terminal of the resistor, and a cathode of the second diode is electrically connected with the second terminal of the second clamping capacitor;

a third diode, wherein an anode of the third diode is electrically connected with the second terminal of the second clamping capacitor and the cathode of the second diode; and a second controllable switch electrically connected with a cathode of the third diode and the second terminal of the second rectifying switch, wherein the first controllable switch is turned on and turned off under the control of the control circuit, wherein while the switching circuit is switched from the full-bridge mode to the half-bridge mode, the second controllable switch is turned on at a time point before the duty cycle of the control signal for controlling the third switch synchronized with the duty cycle of the control signal for controlling the second switch starts to be changed, and the second controllable switch is turned off at a time point after the duty cycle of the control signal for controlling the fourth switch is changed to 100%, wherein while the switching circuit is switched from the half-bridge mode to the full-bridge mode, the second controllable switch is turned on at a time point before the duty cycle of the control signal for controlling the fourth switch starts to be decreased from 100%, and the second controllable switch is turned off at a time point after the duty cycle of the control signal for controlling the third switch is synchronized with the duty cycle of the control signal for controlling the second switch, wherein a time point at which the second controllable switch is turned on is synchronized with a time point at which the first controllable switch is switched from off to on.

12. The DC/DC converter according to claim 11, wherein the first switch, the second switch, the third switch, the fourth switch and the second controllable switch are N-type MOSFET devices, and the first controllable switch is a P-type MOSFET device.

13. The DC/DC converter according to claim 11, wherein a capacitance value of the first clamping capacitor is lower than a capacitance value of the second clamping capacitor.

14. A control method of a DC/DC converter, comprising:

providing a DC/DC converter, wherein the DC/DC converter comprises an input terminal, a switching circuit, a capacitor and a transformer, wherein the switching circuit is electrically connected with the input terminal and comprises a first bridge arm and a second bridge arm connected in parallel, the first bridge arm comprises a first switch and a second switch connected in series, the second bridge arm comprises a third switch and a fourth switch connected in series, and the switching circuit is selectively operated in a full-bridge mode or in a half-bridge mode, wherein a first terminal of the capacitor is electrically connected with a first node between the first switch and the second switch, the transformer comprises a primary winding, the primary winding is electrically connected with a second terminal of the capacitor and a second node between the third switch and the fourth switch;

providing a control circuit, wherein the control circuit generates a plurality of control signals for controlling operations of the switching circuit, wherein the first switch and the second switch are alternately turned on and turned off under the control of the control circuit; and adjusting a duty cycle of the control signal for controlling the third switch and a duty cycle of the control signal for controlling the fourth switch, and allowing the switching circuit to be switched between the full-bridge mode and the half-bridge mode;

wherein while the switching circuit is switched from the full-bridge mode to the half-bridge mode, the control circuit is configured to control the duty cycle of the control signal for controlling the third switch that is originally synchronized with a duty cycle of the control signal for controlling the second switch to decrease to zero gradually, wherein when the duty cycle of the control signal for controlling the third switch is not zero, the control circuit controls the duty cycle of the control signal for controlling the fourth switch to be synchronized with a duty cycle of the control signal for controlling the first switch, wherein after the duty cycle of the control signal for controlling the third switch is changed to zero, the control circuit controls the duty cycle of the control signal for controlling the fourth switch to increase to 100% gradually, wherein the third switch is turned on only in a time interval when the second switch is turned on; and wherein while the switching circuit is switched from the half-bridge mode to the full-bridge mode, the duty cycle of the control signal for controlling the fourth switch that is originally equal to 100% is gradually decreased to be synchronized with the duty cycle of the control signal for controlling the first switch under the control of the control circuit, wherein after the duty cycle of the control signal for controlling the fourth switch is synchronized with the duty cycle of the control signal for controlling the first switch, the duty cycle of the control signal for controlling the third switch is gradually increased from zero to be synchronized with the duty cycle of the control signal for controlling the second switch, wherein the third switch is turned on only in the time interval when the second switch is turned on.

15. The control method according to claim 14, wherein the transformer further comprises a secondary winding comprising a third terminal, a fourth terminal and a center-tap terminal, and the DC/DC converter further comprises:

an output terminal;

a rectifying circuit electrically connected with the secondary winding, and comprising a first rectifying switch and a second rectifying switch, wherein a first terminal of the first rectifying switch is electrically connected with the third terminal of the secondary winding, a second terminal of the first rectifying switch is electrically connected with an output negative terminal of the output terminal, a first terminal of the second rectifying switch is electrically connected with the fourth terminal of the secondary winding, and a second terminal of the second rectifying switch is electrically connected with the output negative terminal of the output terminal; and an output filtering circuit electrically connected with the center-tap terminal, an output positive terminal of the output terminal and the output negative terminal of the output terminal.

16. The control method according to claim 15, wherein the DC/DC converter comprises a capacitor clamping circuit, wherein the capacitor clamping circuit and the second rectifying switch are connected with each other in parallel, and the capacitor clamping circuit comprises:

a clamping capacitor, wherein a first terminal of the clamping capacitor is electrically connected with the first terminal of the second rectifying switch;

a first controllable switch electrically connected between a second terminal of the clamping capacitor and the second terminal of the second rectifying switch;

a resistor, wherein a first terminal of the resistor is electrically connected with the second terminal of the clamping capacitor; and a second controllable switch electrically connected between a second terminal of the resistor and the second terminal of the second rectifying switch, wherein the control method further comprises:

the control circuit controls the first controllable switch to turn on or turn off synchronously with the third switch, and controls the second controllable switch to turn on or turn off synchronously with the second switch.

17. The control method according to claim 15, wherein the DC/DC converter further comprises an active clamping circuit, wherein the active clamping circuit and the second rectifying switch are electrically connected with each other in parallel, and the active clamping circuit comprises:

a first clamping capacitor, wherein a first terminal of the first clamping capacitor is electrically connected with the first terminal of the second rectifying switch;

a first diode, wherein an anode of the first diode is electrically connected with a second terminal of the first clamping capacitor, and a cathode of the first diode is electrically connected with the second terminal of the second rectifying switch;

a resistor, wherein a first terminal of the resistor is electrically connected with the second terminal of the first clamping capacitor; and a first controllable switch electrically connected between a second terminal of the resistor and the second terminal of the second rectifying switch, wherein the control method further comprises:

the control circuit controls the first controllable switch to turn on synchronously with the second switch, and controls the first controllable switch to turn off synchronously with the third switch, wherein the first switch, the second switch, the third switch and the fourth switch are N-type MOSFET devices, and the first controllable switch is a P-type MOSFET device.

18. The control method according to claim 17, wherein the DC/DC converter further comprises a capacitor clamping circuit, wherein the capacitor clamping circuit and the first clamping capacitor are electrically connected in parallel, and the capacitor clamping circuit comprises:

a second clamping capacitor, wherein a first terminal of the second clamping capacitor is electrically connected with the first terminal of the first clamping capacitor; and a second controllable switch electrically connected between a second terminal of the second clamping capacitor and the second terminal of the first clamping capacitor, wherein the control method further comprises:

the control circuit controls the first controllable switch to turn on or turn off, wherein while the switching circuit is switched from the full-bridge mode to the half-bridge mode, the control circuit controls the second controllable switch to turn on at a time point before the duty cycle of the control signal for controlling the third switch synchronized with the duty cycle of the control signal for controlling the second switch starts to be changed, and controls the second controllable switch to turn off at a time point after the duty cycle of the control signal for controlling the fourth switch is changed to 100%, wherein while the switching circuit is switched from the half-bridge mode to the full-bridge mode, the control circuit controls the second controllable switch to turn on at a time point before the duty cycle of the control signal for controlling the fourth switch starts to be decreased from 100%, and controls the second controllable switch to turn off at a time point after the duty cycle of the control signal for controlling the third switch is synchronized with the duty cycle of the control signal for controlling the second switch, wherein a time point at which the second controllable switch starts to be turned on is synchronized with a time point at which the first controllable switch is switched from off to on, wherein the second controllable switch is a N-type MOSFET device.

19. The control method according to claim 17, wherein the DC/DC converter further comprises a capacitor clamping circuit, and the capacitor clamping circuit comprises:

a second clamping capacitor, wherein a first terminal of the second clamping capacitor is electrically connected with the first terminal of the first clamping capacitor;

a second diode, wherein an anode of the second diode is electrically connected with the second terminal of the first clamping capacitor and the first terminal of the resistor, and a cathode of the second diode is electrically connected with a second terminal of the second clamping capacitor;

a third diode, wherein an anode of the third diode is electrically connected with the second terminal of the second clamping capacitor and the cathode of the second diode; and a second controllable switch electrically connected with a cathode of the third diode and the second terminal of the second rectifying switch, wherein the control method further comprises:

while the switching circuit is switched from the full-bridge mode to the half-bridge mode, the control circuit controls the second controllable switch to turn on at a time point before the duty cycle of the control signal for controlling the third switch synchronized with the duty cycle of the control signal for controlling the second switch starts to be changed, and controls the second controllable switch to turn off at a time point after the duty cycle of the control signal for controlling the fourth switch is changed to 100%, while the switching circuit is switched from the half-bridge mode to the full-bridge mode, the control circuit controls the second controllable switch to turn on at a time point before the duty cycle of the control signal for controlling the fourth switch starts to be decreased from 100%, and controls the second controllable switch to turn off at a time point after the duty cycle of the control signal for controlling the third switch is synchronized with the duty cycle of the control signal for controlling the second switch, wherein a time point at which the second controllable switch starts to turn on is synchronized with a time point at which the first controllable switch is switched from off to on, wherein the second controllable switch is a N-type MOSFET device.

* * * * *